United States Patent
Gokak et al.

(10) Patent No.: US 9,533,298 B2
(45) Date of Patent: Jan. 3, 2017

(54) SULPHUR REDUCTION CATALYST ADDITIVE COMPOSITION IN FLUID CATALYTIC CRACKING AND METHOD OF PREPARATION THEREOF

(71) Applicant: BHARAT PETROLEUM CORPORATION LIMITED, Maharashtra (IN)

(72) Inventors: Dattatraya Tammannashastri Gokak, Uttar Pradesh (IN); Chiranjeevi Thota, Uttar Pradesh (IN); Pragya Rai, Uttar Pradesh (IN); N. Jose, Uttar Pradesh (IN); P.S. Viswanathan, Uttar Pradesh (IN)

(73) Assignee: BHARAT PETROLEUM CORPORATION LIMITED, Maharashtra (IN)

( * ) Notice: Subject to any disclaimer, the term of this patent is extended or adjusted under 35 U.S.C. 154(b) by 255 days.

(21) Appl. No.: 13/632,185

(22) Filed: Oct. 1, 2012

(65) Prior Publication Data

US 2013/0081980 A1 Apr. 4, 2013

(30) Foreign Application Priority Data

Sep. 30, 2011 (IN) .......................... 2778/MUM/2011

(51) Int. Cl.
  *B01J 35/10* (2006.01)
  *B01J 35/00* (2006.01)
  (Continued)

(52) U.S. Cl.
  CPC ............. *B01J 35/0006* (2013.01); *B01J 23/02* (2013.01); *B01J 23/06* (2013.01); *B01J 29/061* (2013.01);
  (Continued)

(58) Field of Classification Search
  USPC ......................................................... 502/300
  See application file for complete search history.

(56) References Cited

U.S. PATENT DOCUMENTS

| | | | |
|---|---|---|---|
| 5,290,427 | A | 3/1994 | Fletcher et al. |
| 6,103,105 | A | 8/2000 | Cooper et al. |
| (Continued) | | | |

FOREIGN PATENT DOCUMENTS

| | | | |
|---|---|---|---|
| RU | WO2006067169 | * | 6/2006 |
| RU | 1827685 | * | 9/2007 |

OTHER PUBLICATIONS

Andersson et al., "Cracking catalyst additives for sulfur removal from FCC gasoline", *Catalysis Today*, 53:565-573 (1999).
(Continued)

*Primary Examiner* — Melvin C Mayes
*Assistant Examiner* — Colette Nguyen
(74) *Attorney, Agent, or Firm* — Nixon & Vanderhye P.C.

(57) ABSTRACT

The present invention relates to sulphur reduction catalyst additive composition comprising an inorganic porous support incorporated with metals; an alumino silicate or zeolite component; an alumina component and clay. More particularly the present invention relates to sulphur reduction catalyst additive composition comprising refinery spent catalyst as support. The primary sulphur reduction catalyst additive component of the catalyst composition contains metals of Period III or IV of the Periodic Table, preferably Zinc or Magnesium or combination thereof or one of the transition metals along with other metals.

14 Claims, 2 Drawing Sheets

Pore size distribution of spent refinery catalyst support material (51) Int. Cl.
*B01J 29/08* (2006.01)
*B01J 29/14* (2006.01)
*B01J 29/16* (2006.01)
*C10G 11/02* (2006.01)
*B01J 23/02* (2006.01)
*B01J 23/06* (2006.01)
*B01J 29/06* (2006.01)
*B01J 29/064* (2006.01)
*B01J 29/076* (2006.01)
*B01J 29/10* (2006.01)
*B01J 37/02* (2006.01)
*C10G 11/18* (2006.01)
*B01J 21/04* (2006.01)
*B01J 29/90* (2006.01)
*B01J 37/00* (2006.01)

(52) U.S. Cl.
CPC ............ *B01J 29/064* (2013.01); *B01J 29/076* (2013.01); *B01J 29/084* (2013.01); *B01J 29/088* (2013.01); *B01J 29/106* (2013.01); *B01J 29/146* (2013.01); *B01J 29/166* (2013.01); *B01J 37/0201* (2013.01); *C10G 11/02* (2013.01); *C10G 11/18* (2013.01); *B01J 21/04* (2013.01); *B01J 29/90* (2013.01); *B01J 37/0009* (2013.01); *B01J 2229/42* (2013.01); *C10G 2300/202* (2013.01)

(56) References Cited

U.S. PATENT DOCUMENTS

| | | | |
|---|---|---|---|
| 6,482,315 B1* | 11/2002 | Roberie | C10G 11/05 208/208 R |
| 6,558,533 B2* | 5/2003 | Schmidt et al. | 208/244 |
| 6,602,818 B2* | 8/2003 | Choi | B01D 53/8628 502/219 |
| 6,635,168 B2* | 10/2003 | Zhao et al. | 208/120.01 |
| 6,692,635 B2 | 2/2004 | Didillon et al. | |
| 6,852,214 B1* | 2/2005 | Chester et al. | 208/113 |
| 7,347,929 B2 | 3/2008 | Vierheilig et al. | |
| 7,431,825 B2 | 10/2008 | Vierheilig et al. | |
| 7,476,638 B2 | 1/2009 | Chester et al. | |
| 7,507,686 B2 | 3/2009 | Chester et al. | |
| 7,763,164 B1 | 7/2010 | Turner et al. | |
| 8,409,428 B2* | 4/2013 | Dean et al. | 208/213 |
| 8,623,199 B2* | 1/2014 | Bourane et al. | 208/213 |
| 2005/0124485 A1* | 6/2005 | Chester | B01J 29/0308 502/64 |
| 2005/0199554 A1* | 9/2005 | Goolsby et al. | 210/695 |
| 2007/0249495 A1* | 10/2007 | Gao | B01J 23/002 502/300 |
| 2008/0306172 A1* | 12/2008 | Reynhout | B01J 21/063 518/719 |

OTHER PUBLICATIONS

Harding et al., "New developments in FCC catalyst technology", *Applied Catalysis A: General*, 221:389-396 (2001).

Myrstad et al., "Sulphur reduction of fluid catalytic cracking (FCC) naphtha by an in situ Zn/Mg(Al)O FCC additive", *Applied Catalysis A: General*, 187:207-212 (1999).

Vargas-Tah, et al., "A study on sulfur reduction in FCC gasoline using Zn-Mg-Al spinels", *Catalysis Today*, 107-108:713-718 (2005).

* cited by examiner

Fig. 1 Pore size distribution of spent refinery catalyst support material

Fig. 2 N2 adsorption isotherm and pores size distribution of Commercial alumina support

SULPHUR REDUCTION CATALYST ADDITIVE COMPOSITION IN FLUID CATALYTIC CRACKING AND METHOD OF PREPARATION THEREOF

This application claims priority to IN Patent Application No. 2778/MUM/2011 filed 30 Sep. 2011, the entire contents of which is hereby incorporated by reference.

FIELD OF THE INVENTION

The present invention relates to sulphur reduction catalyst composition comprising discarded refinery spent catalyst. The present invention provides process for preparing sulphur reduction catalyst composition comprising modifying the discarded refinery spent catalyst or using fresh material. The present invention also provides a catalyst composition for reducing gasoline range product sulphur and a process of using the same.

BACKGROUND OF THE INVENTION

Euro-IV specifications have been introduced in different countries imposing the use of gasoline sulphur to less than 50 ppm. Fluid Catalytic Cracking (FCC) unit contributes about 80-90% of the total pool of gasoline in refinery, therefore sulphur levels in this need to be decreased significantly. Refiners adopt different strategies to meet Euro IV regulations. Excess sulphur compounds in gasoline increase SOx emissions in combustion gases, reduce the activity of catalytic converter, attached to transportation vehicles and also promote corrosion of engine parts. It has been claimed that reducing sulphur content in gasoline to 50 ppm or less can improve the effectiveness of catalytic converters in reducing NOx, CO, and unburned hydrocarbons. Various methods for gasoline sulphur reduction are practiced such as Hydro treatment of FCC feed or full-range FCC gasoline.
Undercutting FCC gasoline
Adjusting reactor and regenerator conditions
Selection of low-sulphur feeds
Increasing catalyst-to-oil ratios
Use of catalysts with higher hydrogen transfer activity (rare earth exchanged)
Use of gasoline sulphur reduction additives.

Refiners have to choose between capital investment route of hydrotreating FCC feed or gasoline or lower the gasoline end-point and incur yield loss. However, in this process high octane gasoline is converted into poor quality diesel. Technological advances in catalysts provide better solution to reduce sulphur and emission levels. Use of additives provides less expensive flexible solution to significantly reduce gasoline sulphur without affecting yield or operational constraints. In the catalytic cracking high boiling hydrocarbon fractions are converted into lighter products during the cracking reactions coke is deposited onto the catalyst which is regenerated and reused for cracking.

FCC feed stocks normally contain sulphur in the form of organic sulphur compounds such as mercaptans, sulfides and thiophenes/substituted thiophenes. The products of the cracking process correspondingly tend to contain unconverted sulphur compounds even though about half of the sulphur compounds are converted to hydrogen sulfide during the cracking process. Sulphur distribution in the cracked products depends on number of factors including feed quality, catalyst type, additives used, conversion and other operating conditions. But, in any case a certain proportion of the sulphur ends up in the light or heavy gasoline fractions and passes over to the product pool. FCC gasoline is the main contributor of refinery gasoline pool and needs special attention. Various attempts have been made in this regard which have been either published or patented.

U.S. Pat. No. 7,763,164 B1 discloses a catalyst or additive for reducing FCC gasoline and diesel blend stock sulphur content. This invention describes the use of transition metal oxides of cobalt and molybdenum for minimizing sulphur compound formation in the FCC riser.

U.S. Pat. No. 7,507,686 B2 teaches use of a sulphur reduction catalyst composition which contains a metal mainly Vanadium and Cerium stabilized USY zeolite.

U.S. Pat. No. 7,476,638 B2, U.S. Pat. No. 7,347,929 B2, U.S. Pat. No. 6,852,214 B1 disclose formulation wherein addition to USY molecular sieve; ZSM-5 is used with different metal combinations.

U.S. Pat. No. 7,431,825 B2 discloses a method for gasoline sulphur reduction using hydrotalcite and mixed metal oxide catalysts.

U.S. Pat. No. 6,692,635 B2 discloses a process for the production of gasoline with low sulphur content that comprises a hydrogenation stage of the unsaturated sulphur containing compounds and a decomposition stage of saturated sulphur containing compounds; and optionally a preliminary stage for pre-treatment of the feedstock such as selective hydrogenation of dienes. This patent does not disclose the use of catalyst additive for catalytic cracking process.

U.S. Pat. No. 5,290,427 discloses a process for hydro treatment of gasoline that consists of in fractionating the gasoline, desulphurizing the fractions and then reacting with ZSM-5 for compensating the octane loss. This patent does not disclose the use of catalyst additive.

U.S. Pat. No. 6,635,168 B2 teaches gasoline sulphur reduction (GSR) compositions containing Y zeolite and lewis acid impregnated alumina mixtures. Lewis acid is preferably Zn and preferably around 50% of the additive mixture of Y zeolite used as GSR. This patent does not disclose the reuse of refinery discarded catalyst.

U.S. Pat. No. 6,482,315 B1 discloses gasoline sulphur reduction compositions comprising alumina with Vanadium metal. The sulphur reduction catalyst is used in the form of a separate particle additive in combination with the active catalytic cracking catalyst to process hydrocarbon feed stocks in the fluid catalytic cracking (FCC) unit to produce low-sulphur gasoline and other liquid products.

U.S. Pat. No. 6,103,105 discloses process for the reduction of sulphur content in a FCC gasoline which includes fractionation of the FCC gasoline into different fractions wherein heavier fractions are hydro treated separately and the mixture is again treated and finally reaches the required sulphur level.

Not withstanding the amount of material available in the prior art, there is a continuous need to reuse waste products and provide useful and better products in FCC. There is a need in the prior art of a sulphur reduction catalyst composition comprising better physical properties superior performance without affecting the main FCC catalyst performance.

OBJECTS OF THE INVENTION

The primary object of this invention is to provide gasoline sulphur reduction catalyst composition using refinery discarded spent catalyst or a fresh material.

Another object of the invention is to provide a method of preparation of gasoline sulphur reduction catalyst additive by using modified discarded refinery catalyst, which is pretreated for coke removal, or by using fresh material as a support.

Yet another object of the invention is to provide a method for sulphur reduction in fluid catalytic cracking (FCC) by contacting feed stream with the catalyst additive along with equilibrium fluid catalytic cracking catalyst or a fresh FCC catalyst in variable proportions.

SUMMARY OF THE INVENTION

Several catalytic formulations have been developed for the removal of sulphur in the FCC gasoline range molecules. The present invention relates to the usage of discarded refinery spent catalyst for said process in addition to use of fresh material. The invention provides a catalyst additive composition for reducing sulphur and a process of using the same in FCC for reducing gasoline range sulphur using said composition.

Accordingly, the present invention provides a sulphur reduction catalyst additive composition comprising (i) an inorganic porous support incorporated with metals in the range of 1 to 20% selected from the group comprising Group I, IIA, III, IV, V, VIII metals, rare earth metals and combinations thereof; (ii) an alumino silicate or zeolite component; (iii) an alumina component; and (iv) clay component.

In another embodiment the present invention provides that the support is selected from discarded spent FCC catalyst; fresh FCC catalyst or a mixture of discarded spent FCC catalyst and fresh FCC catalyst.

In yet another embodiment the present invention provides that the support is discarded spent FCC catalyst comprising: (i) from 0.01 to 0.25% by weight of a metals of Group I; (ii) from 0.01 to 0.7% by weight of a metals of Group II; (iii) from 1.0 to 52% by weight of a metals of Group III; (iv) from 1.0 to 45% by weight of metal of Group IV; (v) from 0.01 to 0.7% by weight of a metals of Group V; (vi) from 0.01 to 1.2% by weight of rare earth oxides; and (vii) from 0.01 to 0.45% by weight of a metals of Group VIII.

In still another embodiment the present invention provides that the the metals of Group II are Magnesium or Zinc or combination thereof.

In a further embodiment the present invention provides that the Group III metal is Aluminium; Group IV metal is Silicon; and Group V metal is Vanadium.

In another embodiment the present invention provides that in sulphur reduction catalyst additive composition Magnesium is in the range of 1 to 15 wt % more preferably in the range of 1 to 10 wt %, most preferably in the range of 1 to 7 wt %.

In yet another embodiment the present invention provides that in sulphur reduction catalyst additive composition Zinc is present in the range of 1 to 15 wt %, more preferably in the range of 1 to 10 wt %, most preferably in the range of 1 to 7 wt %.

In still another embodiment the present invention provides that in sulphur reduction catalyst additive composition Vanadium in the range of 1 to 10 wt %, more preferably in the range 1 to 5 wt %, most preferably in the range of 1 to 2 wt %.

In a further embodiment the present invention provides that a catalyst additive composition wherein Group I metal is sodium; Group II metals are selected from the group comprising Magnesium or Zinc or combination thereof; Group III metal is Aluminium; Group IV metal is Silicon; Group V metals are selected from the group comprising Vanadium, Phosphorous or combination thereof; Group VIII metals are selected from the group comprising Nickel, iron or combination thereof; and rare earth oxides are selected from the group comprising Lanthanum or Cerium.

In another embodiment the present invention provides that the Lanthanum or Cerium is present in the range of 0.01 to 1.2 wt % in the catalyst additive composition.

In yet another embodiment the present invention provides that in catalyst additive composition alumino silicate or zeolite component is present in the range of 1 to 56 wt %

In still another embodiment the present invention provides that the catalyst support has uni-model pore distribution with pores in the range of 20° A to 240° A; average pore size of 42° A; a surface area in the range of 130 to 150 m$^2$/g; pore volume of 0.1 to 0.2 cc/g; bulk density in the range of 0.8 to 0.9 g/ml; and attrition index of about 1 to 5 wt %.

In a further embodiment the present invention provides that the catalyst additive composition has attrition strength in the range of 1 to 5%.

In another embodiment the present invention provides that the catalyst additive composition enhances the conversion and has no dilution effect when used in the FCC process.

In yet another embodiment the present invention provides a process for preparing sulphur reduction catalyst additive composition comprising the steps of: (i) pre-treating refinery discarded FCC spent catalyst with an average particle size of about 60-80 microns to remove carbon from support to obtain a composite; (ii) drying the composite of step (i) by heating at 500° C. in air for 4 Hrs; (iii) incorporating group III or IV metals on the dried composite of step (ii); (iv) incorporating metals of group I, II, V, VIII and rare earth metals before or after step (iii); and (v) subjecting the dried composite to calcinations.

In still another embodiment the present invention provides that in step (iii) the period III or IV metal is incorporated by equilibrium adsorption or by wet impregnation method at room temperature or at temperature up to 40° C.

In a further embodiment the present invention provides that the pre-treatment removes carbon from spent catalyst comprising the steps of: (i) heating the refinery discarded FCC spent catalyst in a furnace at the rate of 2° C./minute till the reaction temperature reaches around 550° C.; and (ii) dwelling the reaction mixture at about 150-550° C. for 2 to 6 hours in controlled oxygen atmosphere (oxygen 1 to 5 vol % in inert gas like nitrogen).

In another embodiment the present invention provides that the sulphur reduction catalyst additive composition is used for reducing the gasoline sulphur in FCC process by contacting the discarded spent FCC catalyst; fresh FCC catalyst or a mixture of discarded spent FCC catalyst and fresh FCC catalyst with FCC feed.

DETAILED DESCRIPTION OF THE INVENTION

The present invention can be more fully understood with reference to the following detailed description of the invention and examples.

The present invention provides a catalyst additive composition useful in fluid catalytic cracking processes. The catalyst additive of the present invention is capable of reducing sulphur compounds normally found in gasoline FCC process. The present invention therefore also provides product streams of light and heavy gasoline fractions with substantially lower amounts of sulphur-containing compounds. The reduction of gasoline sulphur in FCC is achieved by using catalyst composition of the present invention which is prepared by using inexpensive discarded refinery spent catalyst along with fresh FCC main cracking catalyst. The present invention discloses a method of reusing the discarded spent refinery catalyst in FCC for sulphur removal by modifying the spent catalyst after the required pre-treatment. The spent refinery inexpensive catalyst is pre-treated in a number of steps before mixing with the fresh catalyst. The catalyst additive of the present invention is used for the removal of sulphur from catalytically cracked vacuum gas oil stream. The catalyst additive of the present invention prepared by the use of spent refinery catalyst becomes effective in removal of sulphur compounds when mixed with main FCC catalyst. Optionally alumina oxide supported catalysts additives are also prepared and compared with commercial catalyst.

Accordingly, the present invention discloses an efficient gasoline sulphur reduction catalyst additive for use in FCC, comprising active elements (a) from 1 to 15% by weight of period III (b) from 1 to 15% by weight of metal of period IV and (c) from 0.01 to 2% by weight of a metal of group V and Group VIII, wherein the active component is incorporated on a support material.

Figure 1:
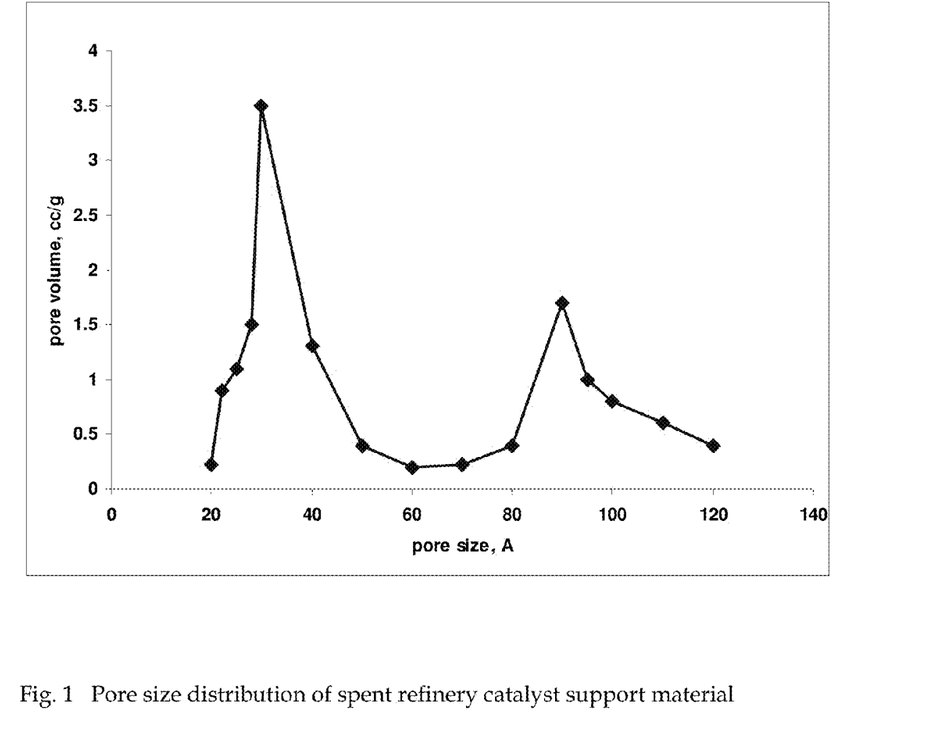
FIG. 1: Pore size distribution of spent refinery catalyst support material used for making catalyst compositions.
Figure 2:
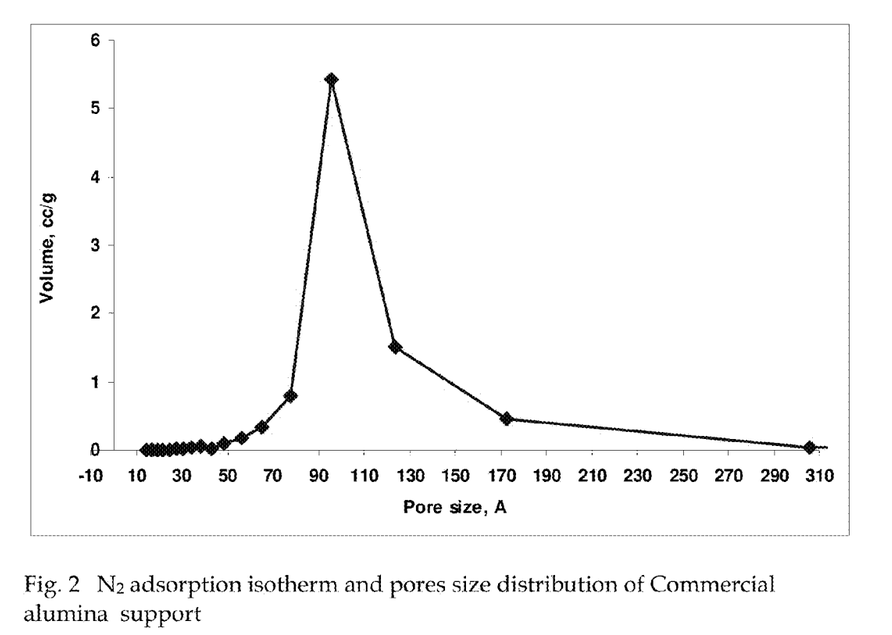
FIG. 2: N2 adsorption isotherm and pores size distribution of commercial alumina support.

The present invention also discloses a method of making improved gasoline sulphur reduction catalyst additive using discarded spent refinery catalyst comprising active ingredients with base material having bi-model pore distribution in the range of 20-150 Å (FIG. 1). The present invention also discloses the preparation of other catalyst additives based on other alumina supports.

The gasoline sulphur reduction catalyst additive has lewis acid sites due to metals/elements or their compounds from periods III or IV. In one embodiment, period III metal is Magnesium. In another embodiment, period IV metal is Zinc or Vanadium. In a further embodiment, the gasoline sulphur reduction catalyst additive comprises 1-80 wt % inorganic support, 1-15 wt % Mg or Zn or V or combination of these metals.

The discarded modified refinery spent catalyst have characteristic properties like surface area in the range of 130-150 m$^2$/g, pore volume of 0.1-0.2 ml/g, apparent bulk density in the range of 0.7-0.9 g/cc, ASTM (American Standard for Testing Materials) attrition index (AI) of about 1-5 wt % and average particle size (APS) of 60-80 microns.

The present invention provides better gasoline sulphur reduction catalyst additive where the catalyst additive is produced by treating the refinery discarded spent catalyst. The present invention also describes a method for catalytically reducing the gasoline sulphur in FCC process by contacting with the disclosed catalyst additive when used along with FCC fresh catalyst.

The catalyst additive of the invention comprises 1 to 15% of a metal from period III or transition metal or a compound thereof, incorporated on a porous inorganic oxide base or treated discarded refinery spent FCC catalyst which promotes the reduction of sulphur compounds in gasoline range. The metal component of the catalyst may additionally comprise of other metal components like V/Ni/Fe in the range of 0.1 to 2 wt % which activate further reduction of sulphur compounds. Essential feature of the catalyst additive of the invention is that it is a discarded FCC spent catalyst containing lewis acidity due to metal deposition. The treated refinery spent catalyst can reduce the gasoline sulphur in FCC process under operating conditions of FCC plant.

The catalyst additives described above can be added to the FCC unit without changing the mode of operating conditions. The catalyst additive can be added directly to the cracking stage, to the regeneration stage of the cracking process or at any other point. The catalyst additive can be added to the circulating catalyst inventory while the cracking process is underway or it may be present in the inventory at the start-up of the FCC operation. As an example, the compositions of this invention can be added to FCC process when replacing existing equilibrium catalyst inventory with fresh catalyst. Under FCC reactor conditions carbocation reactions occur to cause molecular size reduction of petroleum hydrocarbon feedstock introduced into the reactor. As fresh catalyst within FCC unit, is exposed to various conditions, such as the deposition of feedstock contaminants produced during the reaction and severe regeneration operating conditions results into equilibrium catalyst (E-Cat). Thus, equilibrium catalysts may contain high levels of metal contaminants, exhibit lower activity, have lower aluminium content in the zeolite framework and have different physical properties than fresh catalyst. In normal operation, refiners withdraw small amount of the equilibrium catalyst from the regenerators and replace it with fresh catalyst to control the activity of the circulating catalyst inventory.

In conventional FCC unit wherein the reaction temperatures range from about 400° C. to 600° C., with regeneration occurring at temperatures from about 500° C. to 800° C. The actual process parameters depend on the petroleum feedstock being treated, the product streams desired and product specification is met as per environmental norms. The FCC catalyst is circulated within the unit in a continuous manner between catalytic cracking and regeneration zones while maintaining the desired level of catalyst inventory in the reactor.

The effect of the present catalyst additive and process of using the same is to reduce the sulphur content, especially those associated with thiophenes and substituted thiophenes and benzothiophene of the light products (e.g. those of the gasoline fraction having a boiling point of up to about 220° C. in a FCCU product fraction). Thiophenic and benzothiophene compounds are major constituents of gasoline present in higher boiling range and these are difficult to crack. It is generally believed that thiophene conversion requires hydrogen transfer (HT) reactions before cracking (Scheme-1).

Scheme-1

Gasoline sulphur reduction mechanism in a FCC process is not fully understood. However it is believed that the reduction follows cracking of sulphur species formed in the process to release H$_2$S, or inhibition of formation of sulphur compounds. Harding et al. ("New developments in FCC technology" Appl. Catal. A221 (2001), P389) have proposed that gasoline sulphur reduction additives primarily enhance the rate of tetra hydro thiophene (THT) cracking to H$_2$S, thus preventing its conversion to thiophene by hydrogenation reactions. Alternatively, gasoline sulphur reduction can be due to improved hydrogen transfer to thiophenic species initiated by the increase of coke production (Anderson et al, Catal. Today, 53 (1999) 565, T. Myrstad et al. Catal. A Gen. 87 (1999) 207). More recently, Shan et al. and Vargas et al (Shan et al, Catal. Today, 77 (2002) 117 and Vargas et al Catal. Today 107-108, 2005) have proposed that sulphur reduction occurs by strong adsorption of thiophenic species on Lewis acid sites of the additive and further cracking.

The amount of sulphur in FCC gasoline stream depends on the types of sulphur compounds present in feed. Gasoline cuts from FCC process normally have a boiling point ranging up to 220° C. In general, the sulphur content of the whole of FCC gasoline is over 300-600 ppm by weight. When the end point of the cut is greater than 220° C., the sulphur content can be over 1000 ppm by weight.

The catalyst additive of the present invention improves the sulphur reduction activity when it is used in 10 wt % in base catalyst. Higher concentrations of the additive viz 10-30 wt % gives more activity. The catalyst additive is stable having gasoline sulphur reduction activity when used in FCC reactor.

For the purposes herein, and/or the examples below, and unless otherwise stated, the terms below have the definitions indicated.
(i) "Fresh" fluid cracking catalyst is catalyst, as supplied and sold by catalyst vendors.
(ii) "Equilibrium" fluid catalytic cracking catalyst (E-Cat) is the catalyst drawn from the inventory of circulating catalyst after certain time.
(iii) The hydrocarbon stripped coke laid catalyst collected from FCC stripper out let is referred as "Spent catalyst".

The present invention is illustrated and supported by the following examples. These are merely representative examples and are not intended to restrict the scope of the present invention in any way.

The following examples describe preferred embodiments of the invention. The specific examples given herein, however, should not to be construed as forming the only genus that is considered as the invention, and any combination of the process or their steps may itself form a genus. Other embodiments within the scope of the claims herein will be apparent to one skilled in the art from consideration of the specification or practice of the invention as disclosed herein. The following examples demonstrate the procedure for making the additive catalyst having improved properties as described in the present invention. These examples also compare various approaches made to arrive at a better catalyst composition.

The properties of gasoline sulphur reduction catalyst supports of the present invention are summarized in Table-8.

EXAMPLES

Gasoline sulphur reduction catalyst additive activity studies as described in all the examples hereinafter were carried out in a fixed bed quartz reactor. The reaction was carried out in an isothermal condition. Feed containing known sulphur (2000 ppm) was used for evaluation studies. All the catalyst additives evaluation was carried out with 10.0 wt % additive along with the known amount of base equilibrium catalyst. Inert gas or hydrogen was used as carrier during the reaction. The reaction was carried out for two hours at 515° C. Liquid product samples were stripped off for dissolved $H_2S$ gas and analyzed for total sulphur using thermo euro glass analyzer and GC-SCD as per ASTM D 5453 method.

The Following Equation is Used to Define the Sulphur Reduction Activity:

"Sulphur reduction Activity(%)=(Sulphur in feed−Sulphur in product)/Sulphur in feed*100"

Example-1

As a base case, known amount of FCC commercial equilibrium catalyst which was used as base material in these studies without any catalyst additive was evaluated in a fixed bed reactor as described above. The product collected was analyzed for total sulphur and this was considered as base experiment for the purpose of comparison. The properties of base equilibrium catalyst and activity for sulphur reduction are given in Table-1 below.

TABLE 1

| Property | Plant Equilibrium Catalyst |
|---|---|
| SA($m^2$/g) | 172 |
| AI (wt %) | 4 |
| ABD(g/cc) | 0.82 |
| APS(μ) | 84 |
| Sulphur reduction activity (%) | 8.5 |

Example-2

This example teaches the preparation of various catalyst formulations by using commercial alumina supports named Alumina-1 & 2. Physical Characterization of this support given in Table.2, period III and period IV metals were impregnated on Alumina-1 & 2 supports. High purity chemical salts were used as precursors for the preparation of the catalyst additives. Active metal incorporation was carried out by incipient wetness method. Metal deposited samples were dried at 110° C. for 8-12 Hrs and subsequently calcined at 540° C. for 3-4 hours. All catalyst additive samples were tested for sulphur reduction activity as described in the example 1 and adding 10 Wt % of additive along with the base catalyst. The results are presented in Table.3. The catalyst additives were named as 1 and 2 for alumina support-1 prepared with metals Zn and Mg and 3 and 4 for alumina support-2 prepared with metals Zn and Mg respectively.

TABLE 2

| Support | Total S.A $m^2$/g | Total pore volume Cc/g | Attrition Index Wt % |
|---|---|---|---|
| Alumina-1 | 170 | 0.5 | 7 |
| Alumina-2 | 50 | 0.1 | 6 |

TABLE 3

| Catalyst Additive | Total S.A, $m^2$/g | Total pore volume Cc/g | Activity % |
|---|---|---|---|
| 1 | 156 | 0.4 | 60 |
| 2 | 53 | 0.22 | 62 |
| 3 | 151 | 0.45 | 58 |
| 4 | 50 | 0.11 | 59 |

Even though sulphur reduction activity is better these formulations were not considered for commercialization due to their poor mechanical properties.

Example-3

Refinery FCC spent catalyst is pre-treated for removal of coke by burning in air in a controlled fashion by heating at a rate of 2-10 C/min up to 500 C and holding it for sufficient time till the coke is burned. The coke burned FCC spent catalyst is used as support. A better catalyst additive is prepared by incorporating known amount of Period III metal Magnesium by using metal nitrates and following the incipient wet impregnation technique followed by drying at 110° C. for 10-12 Hrs and subsequent calcination at 540° C. for four hours. These catalysts additives were named as BPC-1, BPC-2, BPC-3, BPC-4 and BPC-5 for different amounts of active metal loaded respectively. All catalyst additive samples were tested for sulphur reduction activity by following the procedure described in Example-1 using 10 wt % additive component. Activity results are presented in the Table.4. BPC-1 and 2 found to be better additive in these series.

TABLE 4

| Catalyst additive | Metal, wt % | Activity, % |
|---|---|---|
| BPC-1 | 7 | 40 |
| BPC-2 | 9 | 59 |
| BPC-3 | 11 | 37 |
| BPC-4 | 13 | 22 |
| BPC-5 | 15 | 12 |

Example-4

In another breakthrough experiment Period IV metal, zinc based catalyst formulations are investigated. Metal nitrate salt was used as precursor for the preparation of the catalyst additive. With the same support as described in previous example and prepared catalyst additives by using group IV metal. Physical properties of the discarded spent catalyst after treating were presented in Table: 8. Metal concentration was varied from 5 to 15 wt %. Metal impregnated samples are dried at 110° C. for 10-12 Hrs and subsequently calcined at 540° C. for four hours. All catalyst samples were tested for sulphur reduction activity by following the procedure explained in the Example 1, and results were presented in the Table.5. From the Table, it is clear that sulphur reduction activity varies with metal content. BPC-7 has good activity among these series of additives and is considered for further studies.

TABLE 5

| Catalyst additive | Metal, wt % | Activity, % |
|---|---|---|
| BPC-6 | 5 | 20 |
| BPC-7 | 7 | 34 |
| BPC-8 | 9 | 34 |
| BPC-9 | 11 | 25 |
| BPC-10 | 13 | 34 |

Example-5

In this example refinery discarded spent catalyst as described in Example-3 was used as support after pre-treatment. In this embodiment another active metal from period 3 i.e Vanadium is used in varying proportions which ranges from 0.1 to 0.6 wt %. Vanadium chloride is used as metal precursor for making the catalyst additive. Procedure followed for making the additive and activity studies is same as described in Example-3. The catalyst additives prepared were designated as BPC-11, 12, 13, 14, 15 and 16 respectively with different loading of metal vanadium. Activity data was given in the Table.6. Results show that 0.2 to 0.4 wt % gives good sulphur reduction activity.

TABLE 6

| Catalyst additive | Metal, wt % | Activity, % |
|---|---|---|
| BPC-11 | 0.1 | 20 |
| BPC-12 | 0.2 | 40 |
| BPC-13 | 0.3 | 42 |
| BPC-14 | 0.4 | 44 |
| BPC-15 | 0.5 | 34 |
| BPC-16 | 0.6 | 35 |

Example-6

For comparison purpose in another set of experiments two commercially available sulphur reduction catalyst additives were tested for sulphur reduction activity by using 10 Wt % of the additive along with the known weight of equilibrium catalyst under similar conditions as described in Example-1. The properties and the activity results are given in Table-7

TABLE 7

| Property | Commercial 1 | Commercial 2 |
|---|---|---|
| SA(m$^2$/g) | 456 | 220 |
| AI (wt %) | 7 | 6 |
| ABD(g/cc) | 0.86 | 0.89 |
| APS(μ) | 75 | 78 |
| Sulphur reduction Activity (%) (Excluding base catalyst activity) | 48 | 57 |

Even though both the commercial samples have better physical properties like SA, BD, APS and activity but possess poor attrition properties.

Example-7

Present example compares the activity of different fresh catalyst formulations prepared and tested for gasoline sulphur reduction activity. From the Table.8, it is clear that period III and V metal supported on modified discarded refinery spent catalysts showing better activity than commercial alumina supported catalysts.

TABLE 8

| Catalyst | Activity % |
|---|---|
| Comm 1 | 48 |
| Comm 2 | 57 |
| BPC 1 | 40 |
| BPC 2 | 59 |
| BPC 1 4 | 44 |

From the figure it is clear that BPC 14 or BPC 2 formulations have comparable sulphur reduction activity to commercial additive formulations.

Example-8

To understand the effect of Gasoline sulphur reduction additive on FCC yields, selected catalyst formulations activity studies were carried out in a Fixed fluid bed PC PLC controlled bench scale unit (FST). In a typical run 9.0 grams of catalyst was used for cracking of vacuum gas oil at Cat/Oil ratio of 6.5@520° C. using $N_2$ as fluidizing media. The cracked gaseous products were condensed at −12° C. and stored. Gaseous products were analyzed using on line GC and liquid samples analyzed off line using Sim Dist GC. Coke formed during reaction analyzed by burning in air in the same reactor and using online IR analyzer. Results are given in Table.9.

TABLE 9

VGO cracking studies in presence of GSR additives

|  | E CAT | BPC-2 | BPC-1 |
|---|---|---|---|
| Temp (° C.) | 500 | 500 | 500 |
| C/O Ratio | 6.5 | 6.5 | 6.5 |
| Conversion (wt %) | 54 | 53.01 | 55.39 |
| Coke (wt %) | 4.944 | 4.792 | 5.596 |
| Dry Gas (Wt %) | 1.477 | 1.303 | 1.408 |
| H2 (wt %) | 0.072 | 0.055 | 0.108 |
| LPG (wt %) | 16.989 | 15.861 | 16.469 |
| GASOLINE(wt %) | 30.646 | 31.056 | 31.916 |
| LCO (wt %) | 21.787 | 20.715 | 21.404 |
| HCO (wt %) | 5.064 | 5.556 | 5.596 |
| Bottom (wt %) | 19.153 | 20.718 | 17.61 |

Activity data show that BPC1 formulation yield is 1.39 units more conversion when compared to base case. In case of BPC2 there is loss of one unit conversion. Coke make is with in acceptable limits and dry gas make is less than base case. From the activity studies it is clear that GSR additive formulations do not change the FCC product slate significantly and dilution effect was not observed.

Example-9

In this example a fresh support containing both zeolite and alumina was considered for making the catalyst additive samples. Zeolite used for the preparation of support is Y zeolite procured from the market. During making of the support zeolite Y was exchanged with rare earth metals to the desired extent and mixed with alumina and clay at appropriate portion and calcined at 550° C. for 7-8 hours in air. Main Chemical constituents of the fresh support are given in Table. After calcination this fresh support was incorporated with active metals like Zinc and Magnesium as per the procedure explained in other examples to make the final catalyst additives.

TABLE 9

| | catalyst | | |
|---|---|---|---|
| Support | Alumina, wt % | Zeolite, wt % | $Re_2O_3$, wt % |
| Fresh support | 20-60 | 20-40 | 1-2 |
| Activity, % | | | |
| BPC 17 | | 62 | |
| BPC 18 | | 58 | |

Example-10

In this example fresh catalyst made as per the procedure described in Example 9 was deactivated to assess the activity level after deactivation. Fresh catalyst was subjected to metal deactivation by using Ni and V salts and subsequently steam deactivated as per the procedure described elsewhere (Ref: Catalysis Today Vol 141 (1-2) March 2009 Pg (115-119). This catalyst was used as support for making Mg and Zn based catalysts and additives activity was tested as per the procedure described in other examples. Physical properties and activity results are given in Table.10.

TABLE 10

| Property | Deactivated sample from Example -9 |
|---|---|
| SA ($m^2/s$) | 160 |
| AI (Wt %) | 4.00 |
| ABD (g/ml) | 0.85 |
| APS (μ) | 76.00 |
| Ni (Wt %) | 00.04 |
| V (Wt %) | 00.51 |
| Na (wt %) | 00.18 |
| $Al_2O_3$ (wt %) | 44.00 |
| $Re_2O_3$ (wt %) | 01.42 |
| Zeolite (wt %) | 38.00 |
| Clay | 15.30 |
| Activity, % | |
| BPC 19 | 60 |
| BPC 20 | 56 |

The above results show that deactivated silica alumina support does not loose any activity when compared to fresh support and is comparable with the refinery discarded treated catalyst based formulations.

ADVANTAGES OF THE PRESENT INVENTION

1. The composition and the method of making sulphur reduction catalyst for FCC, which uses novel support, made of discarded refinery spent catalyst with better physical properties.
2. Gasoline sulphur reduction catalyst additive of the present invention has better Attrition Resistance when compared to commercial additives.
3. The present invention addresses the problem of refinery spent catalyst disposal.
4. Catalyst additive of the present invention works well in the presence of FCC main catalyst in the same manner and proportion as the commercial catalyst additive without any dilution effect.
5. The catalyst additive of the present invention increases the conversion in addition to sulphur reduction

We claim:

1. A sulphur reduction catalyst additive composition comprising:
   (i) an inorganic porous support, incorporated with the following elements and combinations thereof:
      (a) from 0.01 to 0.25% by weight of a metal of Group I;
      (b) from 1 to 15% by weight of Magnesium or Zinc or a combination thereof;
      (c) from 1 to 52% by weight of Aluminum;
      (d) from 1 to 45% by weight of Silicon;
      (e) from 1 to 10% by weight of Vanadium;
      (f) from 0.01 to 1.2% by weight of rare earth oxides;
      (g) from 0.01 to 0.45% by weight of a metal of Group VIII;
   (ii) an alumino silicate or zeolite component;
   (iii) an alumina component; and
   (iv) a clay component;
   wherein the support is discarded spent catalyst;
   wherein the support has a bi-modal pore distribution with pores in the range of 20 A to 150 A; a surface area in the range of 130 to 150 m2/g; pore volume of 0.1 to 0.2 cc/g; and a bulk density in the range of 0/7 to 0.9 g/ml; and wherein the sulphur reduction catalyst additive composition has an attrition index of about 1 to 5 wt. %.

2. A sulphur reduction catalyst additive composition comprising:
(i) a discarded spent FCC catalyst as support;
(ii) from 0.01 to 0.25% by weight of a metal of Group I;
(iii) from 0.01 to 0.7% by weight of Magnesium, Zinc or a combination thereof;
(iv) from 1.0 to 52% by weight of Aluminum;
(v) from 1.0 to 45% by weight of Silicon;
(vi) from 0.01 to 0.7% by weight of Vanadium;
(vii) from 0.01 to 1.2% by weight of rare earth oxides; and
(viii) from 0.01 to 0.45% by weight of a metal of Group VIII,
wherein the support has a bi-modal pore distribution with pores in the range of 20 A to 150 A; a surface area in the range of 130 to 150 m2/q; pore volume of 0.1 to 0.2 cc/g; and a bulk density in the range of 0/7 to 0.9 g/ml.

3. The catalyst additive composition as claimed in claim 2 wherein said Group I metal is sodium; Group VIII metals are selected from the group consisting of Nickel, Iron and combination thereof; and rare earth oxides are selected from the group consisting of Lanthanum and Cerium.

4. The catalyst additive composition as claimed in claim 1 wherein Magnesium is present in the range of 1 to 10 wt %.

5. The catalyst additive composition as claimed in claim 1 wherein Zinc is present in the range of 1 to 10 wt %.

6. The catalyst additive composition as claimed in claim 5, wherein Zinc is present in the range of 1 to 7 wt %.

7. The catalyst additive composition as claimed in claim 1 wherein Vanadium is present in the range of 1 to 5 wt %.

8. The catalyst additive composition as claimed in claim 7, wherein Vanadium is present in the range of 1 to 2 wt %.

9. The catalyst additive composition as claimed in claim 1 wherein said alumino silicate or zeolite component is present in the range of 1 to 56 wt %.

10. The sulphur reduction catalyst additive as claimed in claim 1, wherein said catalyst additive composition enhances conversion and has no dilution effect when used in the FCC process.

11. The sulphur reduction catalyst additive composition as claimed in claim 1, for reducing the gasoline sulphur in FCC process by contacting it with FCC feed.

12. The catalyst additive composition as claimed in claim 1 wherein said Group I metal is sodium; the Group VIII metals are selected from a member of the group consisting of Nickel, Iron and combination thereof; and the rare earth oxides are selected from the group consisting of Lanthanum and Cerium.

13. A process for preparing sulphur reduction catalyst additive composition comprising the steps of:
i) pre-treating refinery discarded FCC spent catalyst having an average particle size of about 60-80 microns to remove carbon from support to obtain a composite;
ii) drying the composite of step (i) by heating at 500° C. in air for 4 Hrs.;
iii) incorporating aluminum or silicon on the dried composite of step (ii);
iv) incorporating metals of Group I, Aluminum, Vanadium, Group VIII and rare earth metals before or after step (iii);
v) subjecting the dried composite to calcinations;
wherein the support has a bi-modal pore distribution with pores in the range of 20 A to 150 A; a surface area in the range of 130 to 150 m2/g; a pore volume of 0.1 to 0.2 cc/g; and a bulk density in the range of 0/7 to 0.9 g/ml; and
wherein the sulphur reduction catalyst additive composition has an attrition index of about 1 to 5 wt %.

14. The process as claimed in claim 13 wherein in step iii) aluminum or silicon is incorporated by equilibrium adsorption or by wet impregnation method at room temperature or at temperature up to 40° C.

* * * * *